(12) United States Patent
Li et al.

(10) Patent No.: US 8,326,125 B2
(45) Date of Patent: Dec. 4, 2012

(54) METHOD AND DEVICE FOR LINKING MULTIMEDIA DATA

(75) Inventors: Hui Li, Hannover (DE); Dirk Adolph, Ronnenberg (DE); Meinolf Blawat, Hannover (DE); Jobst Hörentrup, Hannover (DE); Uwe Janssen, Seelze (DE); Wolfgang Klausberger, Hannover (DE); Axel Kochale, Springe (DE); Stefan Kubsch, Hohnhorst (DE); Harald Schiller, Hannover (DE); Ralf Ostermann, Hannover (DE); Hartmut Peters, Barsinghausen (DE); Marco Winter, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 1934 days.

(21) Appl. No.: 10/519,574

(22) PCT Filed: Jun. 21, 2003

(86) PCT No.: PCT/EP03/06558
§ 371 (c)(1),
(2), (4) Date: Dec. 29, 2004

(87) PCT Pub. No.: WO2004/006575
PCT Pub. Date: Jan. 15, 2004

(65) Prior Publication Data
US 2011/0123167 A1     May 26, 2011

(30) Foreign Application Priority Data
Jul. 4, 2002   (EP) ..................................... 02014774

(51) Int. Cl.
G11B 27/00    (2006.01)
H04N 5/93     (2006.01)
H04N 9/80     (2006.01)
H04N 7/10     (2006.01)
H04N 7/025    (2006.01)
H04N 5/445    (2006.01)
G06F 3/00     (2006.01)
G06F 13/00    (2006.01)

(52) U.S. Cl. ........ 386/278; 386/239; 386/241; 386/247; 386/248; 386/290; 725/32; 725/36; 725/42

(58) Field of Classification Search .................. 386/239, 386/241, 247, 248, 278, 290; 725/32, 36, 725/42
See application file for complete search history.

(56) References Cited

U.S. PATENT DOCUMENTS

| | | | | |
|---|---|---|---|---|
| 5,559,641 | A | * | 9/1996 | Kajimoto et al. ............. 386/290 |
| 6,750,919 | B1 | * | 6/2004 | Rosser .......................... 348/584 |
| 2001/0038742 | A1 | | 11/2001 | Takano |

FOREIGN PATENT DOCUMENTS

| EP | 0977433 | 2/2000 |
|---|---|---|
| GB | 2361095 | 10/2001 |
| JP | 4-115684 A | 4/1992 |
| JP | 11-317924 A | 11/1999 |

OTHER PUBLICATIONS

Search Report Dated Oct. 13, 2003.

* cited by examiner

*Primary Examiner* — Daquan Zhao
(74) *Attorney, Agent, or Firm* — Robert D. Shedd; Vincent E. Duffy; Joel M. Fogelson

(57) ABSTRACT

It is desired to link photo data and video data taken by a digital camcorder. Therefore, there is provided a device and method for linking multimedia data, wherein linking information is formed on the basis of first and/or second multimedia data. The linking information is stored on a recording medium together with the first multimedia data. The second multimedia data may be stored together with respective linking information to the first multimedia data on a second recording medium. Thus, a camera-man while recording is able to set up logo or index pictures for a video film.

17 Claims, 11 Drawing Sheets

METHOD AND DEVICE FOR LINKING MULTIMEDIA DATA

This application claims the benefit, under 35 U.S.C. §365 of International Application PCT/EP03/006558, filed Jun. 21, 2003, which was published in accordance with PCT Article 21(2) on Jan. 15, 2004 in English and which claims the benefit of European patent application No. 02014774.0, filed Jul. 4, 2002.

The present invention relates to a method and device for linking first and second multimedia data. Particularly, these first and second multimedia data include a video stream and photo pictures.

BACKGROUND

Many digital camcorders can record video films on a tape and photo pictures (or E-video clips) on a media-card. The image contents taken in videos and photos are usually very correlated and coherent. For example, video and photos might be related in the following aspects: taken in the same time; taken at the same place; shot to same objects (persons); shot in a similar scene; taken during the same event; taken under the same mood or feeling; photo and video are content-compensated; photos represent the highlight still contents of a video etc. Many kinds of new camcorders can even record e-video clips on a media card. Such e-video clips represent the highlight of a video. E-video clip is very a kind of video thumbnail.

However, the video films on the tape and the photos (or E-video clips) on the media-card are treated separately by editing and archiving. Such a procedure is illustrated in FIG. 1. A digital camcorder 100 is used for recording 101 a video sequence on a camcorder mini-tape 102. At a later time the video film is played back and edited 103 using a video recorder and a television set 104 or a personal computer 105. Alternatively, the camcorder 100 may record 106 a photo on a camcorder media-card 107. After recording the photo may be viewed and edited 108 by using a personal computer 105.

While recording, no connection (or relation) is defined for the recording contents between video and photo (or e-video clip). Today, editing and customizing the relation between recordings on the tape and the media card requires an editing process separate from the act of recording itself, and this process is also performed on an equipment different from the recording equipment. However, it is impossible for a cameraman while recording to make use of still pictures (or e-video clips) in a media-card in order to set up more attractive features for the video contents on a tape.

INVENTION

In view of that it is the object of the present invention to provide a method and an apparatus which allows linking of two or more different multimedia data.

This object is solved by a method for linking multimedia data including the steps of providing first and second multimedia data, forming linking information on the basis of said first and/or second multimedia data, and storing said linking information on a first recording medium together with said first multimedia data.

Furthermore, according to the present invention there is provided a device for recording multimedia data including providing means for providing first and second multimedia data, linking means connected to said providing means for forming linking information on the basis of said first and/or second multimedia data, and storing means connected to said linking means for storing said linking information on a first recording medium together with said first multimedia data.

Preferably, the first and second multimedia data include video, photo and/or audio data. Thus, it is possible to mutually link a video film or video sequences with photo pictures.

The linking information may include logo or index messages for the video film, the photo pictures and/or any audio sequences. Such logo message contains linking information from a video on the tape to a picture on the media card. The index message contains one or more codes of related pictures on the current media card. With such logo or index messages it is possible to link photo data and video data for example on the basis of a photo picture included in these photo data or by a video section included in this video data. One can easily imagine that a characterizing photo picture facilitates the linkage of a plurality of pictures and video films for the user.

Advantageously, the linking information may be formed in real-time while recording the video on the video tape. Thus, both is possible, the offline editing of logo and index pictures as well as the real time generation of them.

Logo and index messages may be set up and recorded both on a video tape and on a picture media-card. This technique has the advantages of making an easy and fast recording operation possible, of helping the user to do post-editing and of preventing the user from accidently deleting any useful pictures on the multimedia-card.

The pictures may be designed as "logo and index", "logo only" and "index only". Furthermore, some strategies for recording and playback may be designed as "visible" and "invisible", "copy now" and "copy later", "playback with logo" and "playback without logo". Additionally, an e-video-clip may be used as logo or index message. Thus, the present invention helps to set up a significant "bridge" between video essence and photo essence separately recorded by a digital camcorder.

The logo and index pictures (metadata) are usually not generated directly from video frames. They are usually generated by photo shooting before the recording of video contents.

In other words, the Easy Video Logo & Index Picture Generation System according to the present invention for a Camcorder makes it possible to let the camera-man to set up logo or index pictures (or video clip) for video while recording. While a logo or index picture is being created, a logo-mark code is written to a special track on video tape, or a index-mark code is written to a special index file in the media-card. The logo pictures (or video clips) can improve a kind of "picture in picture" function. The logo picture provides additional messages to the recording video, and therefore it makes the recording more attractive. The index picture acts as a kind of rich media metadata for the video essence. It can be utilized to search video essence.

DRAWINGS

Exemplary embodiments of the invention are illustrated in the drawings and are explained in more detail in the following description. In the drawings.

Figure 5:
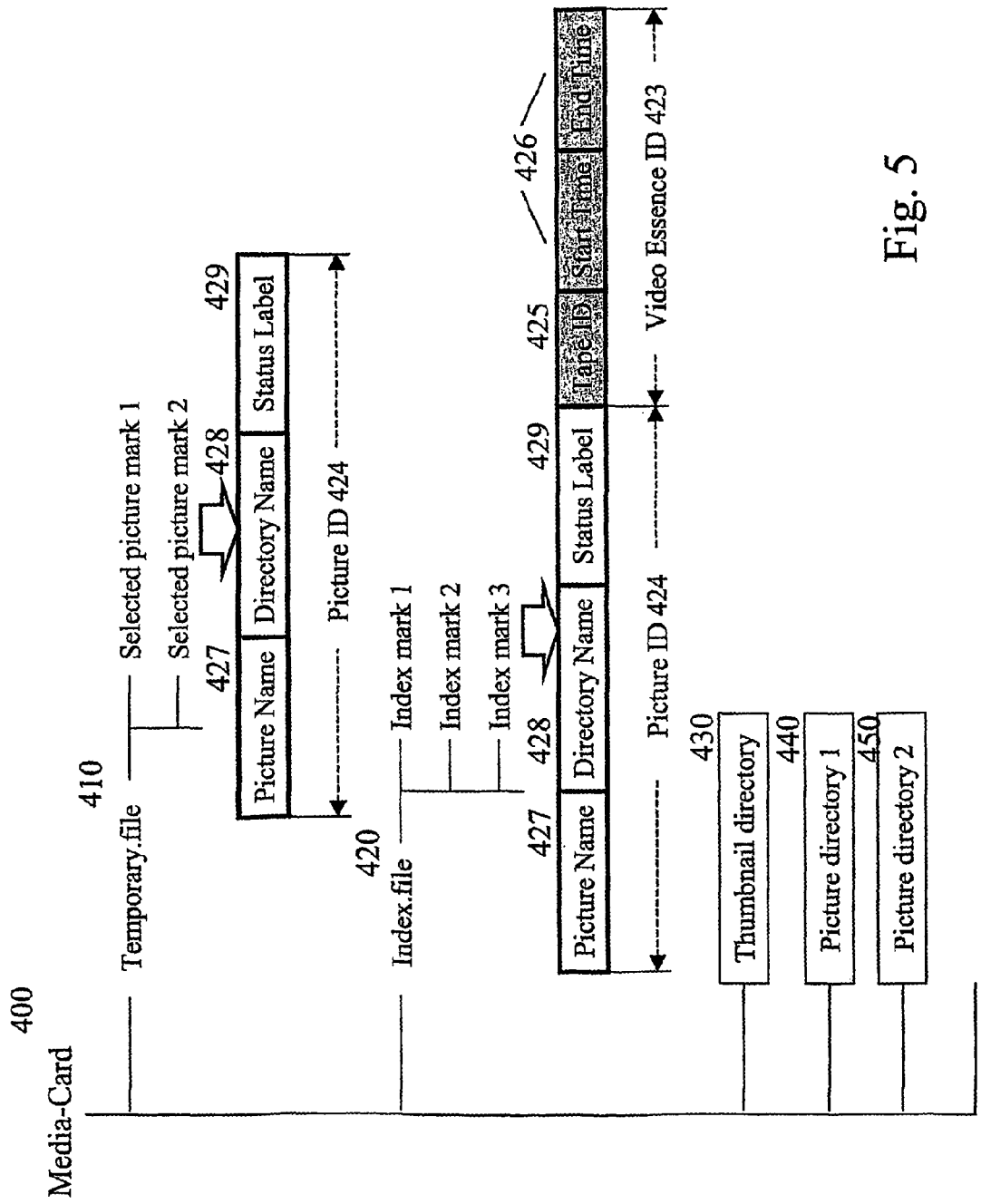
Figure 6:
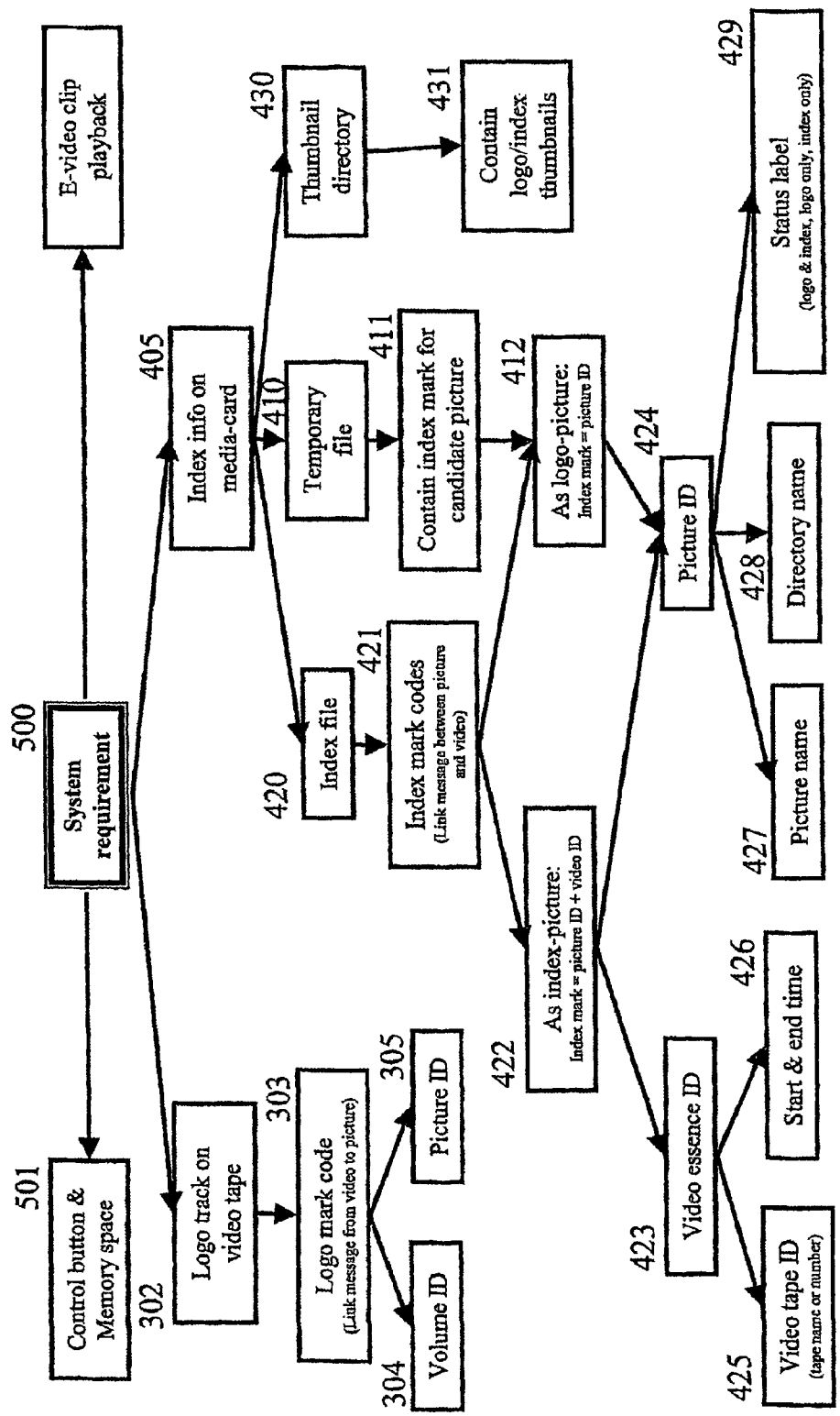
Figure 7:
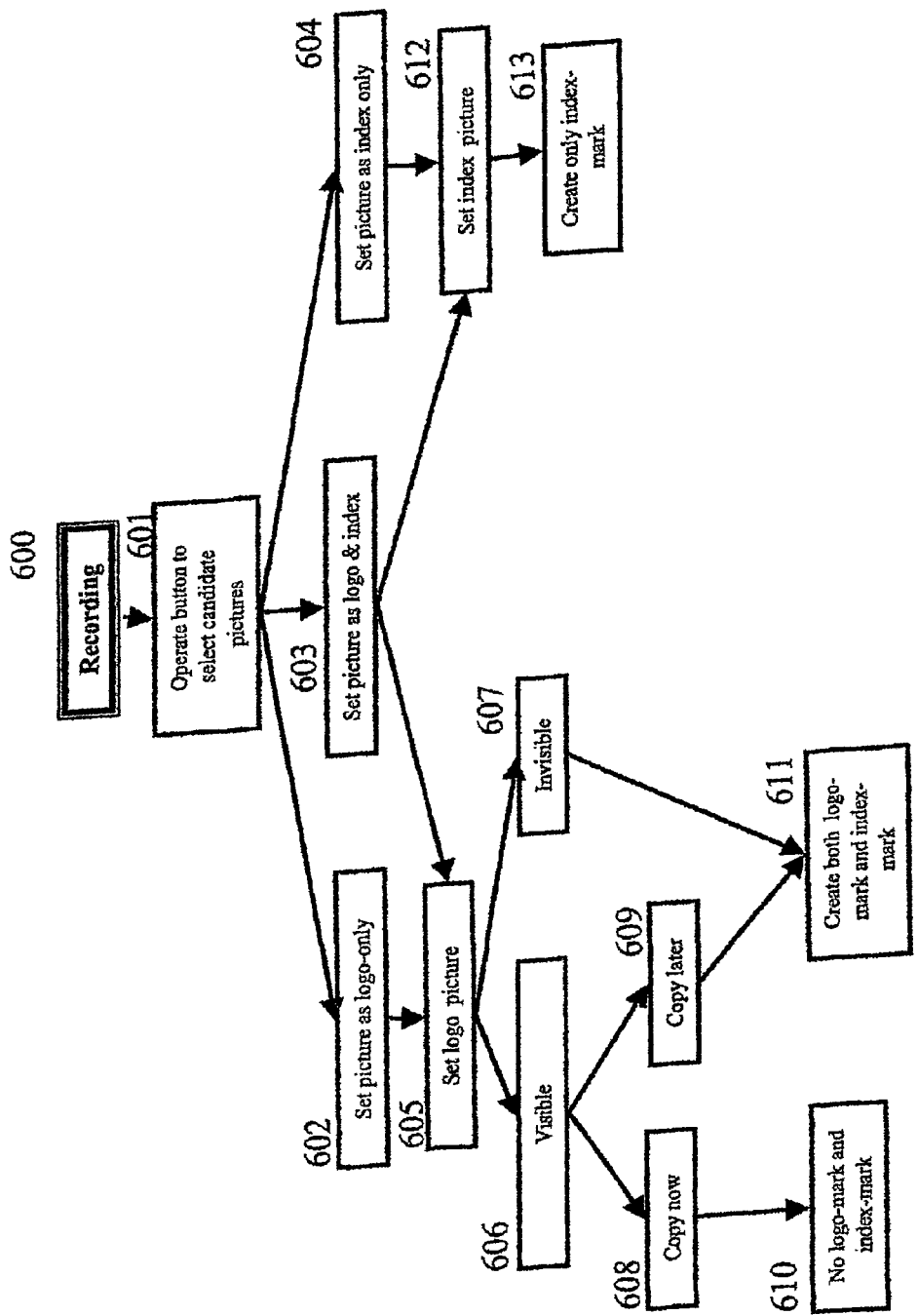
Figure 8:
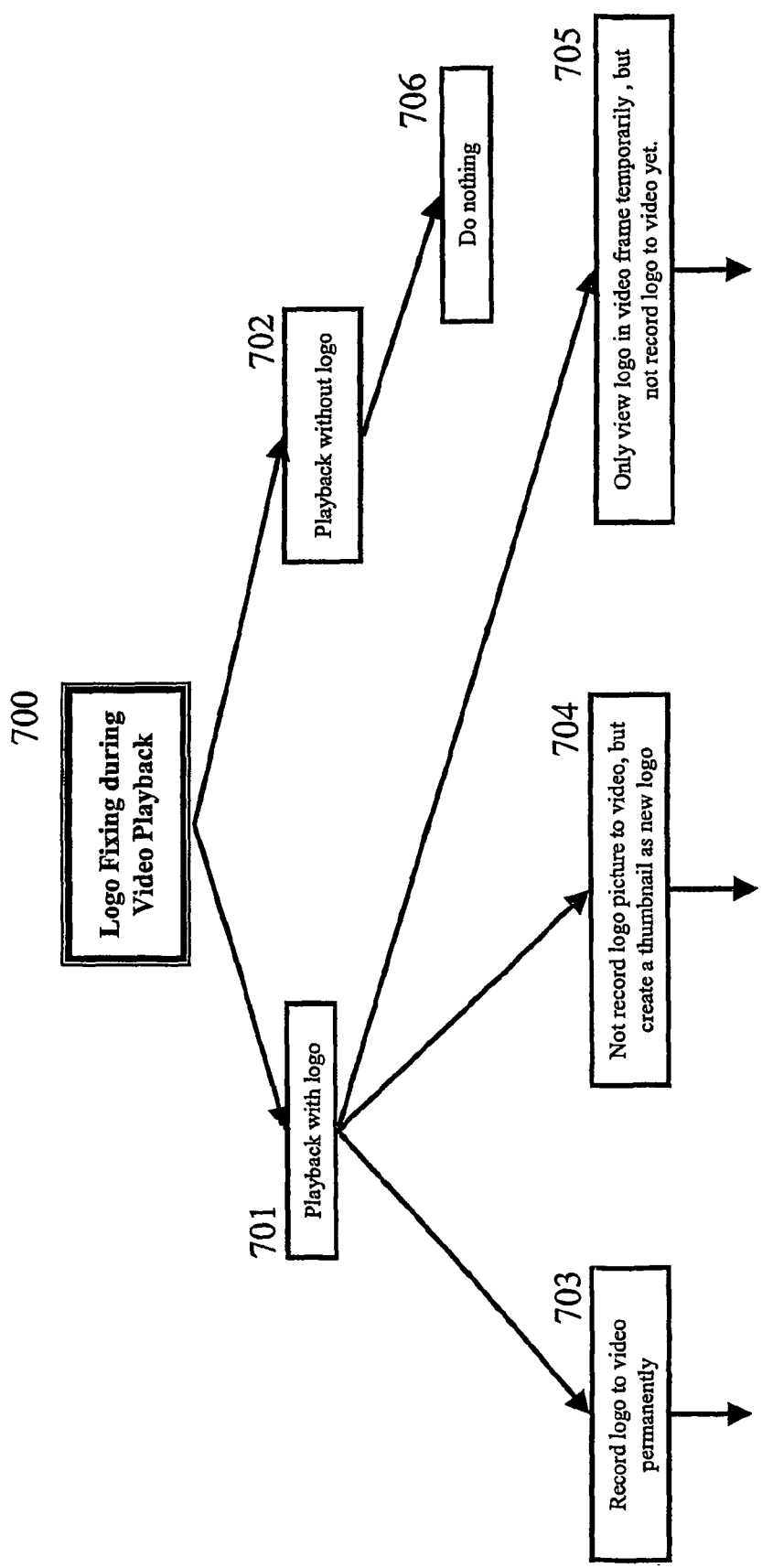
Figure 9:
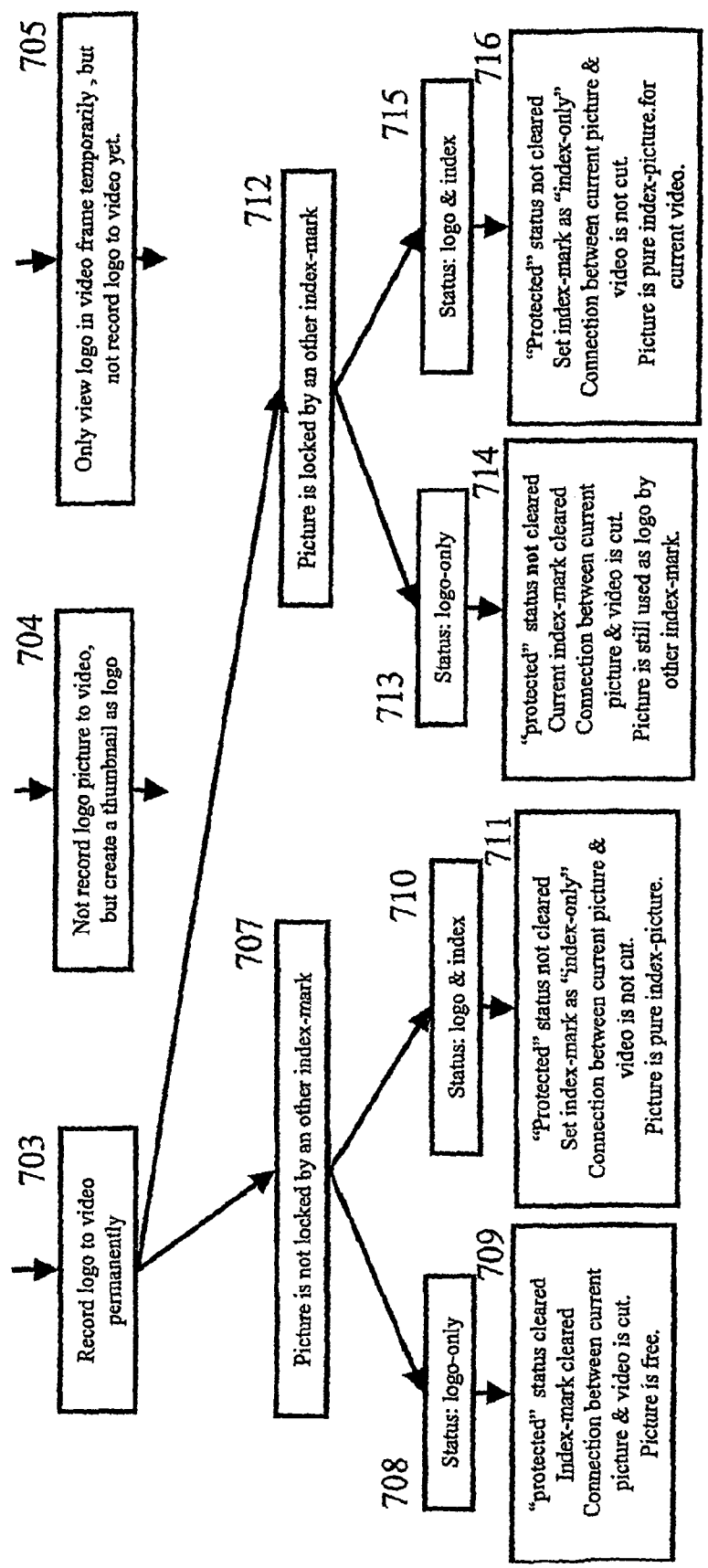
Figure 10:
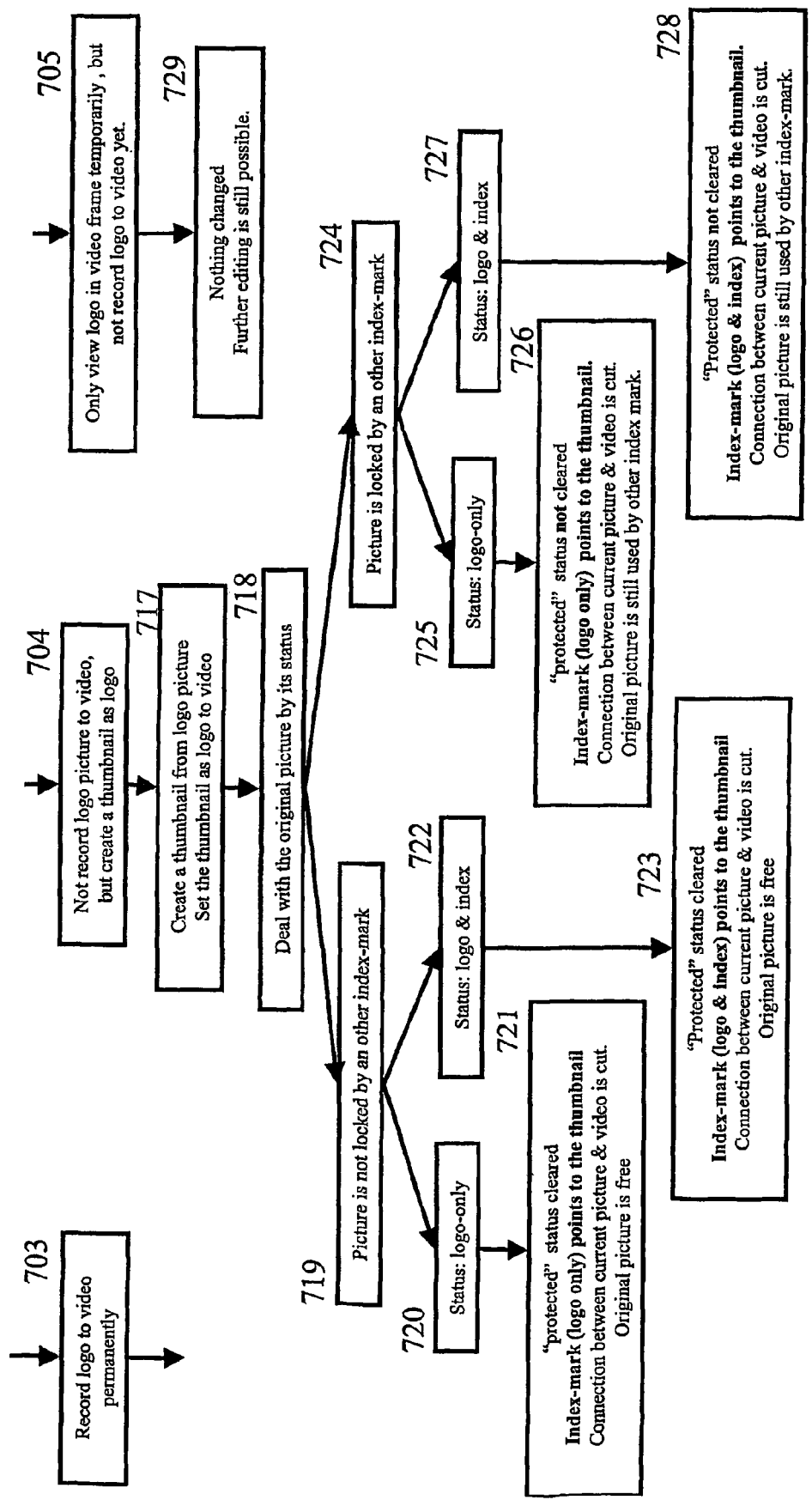
Figure 11:
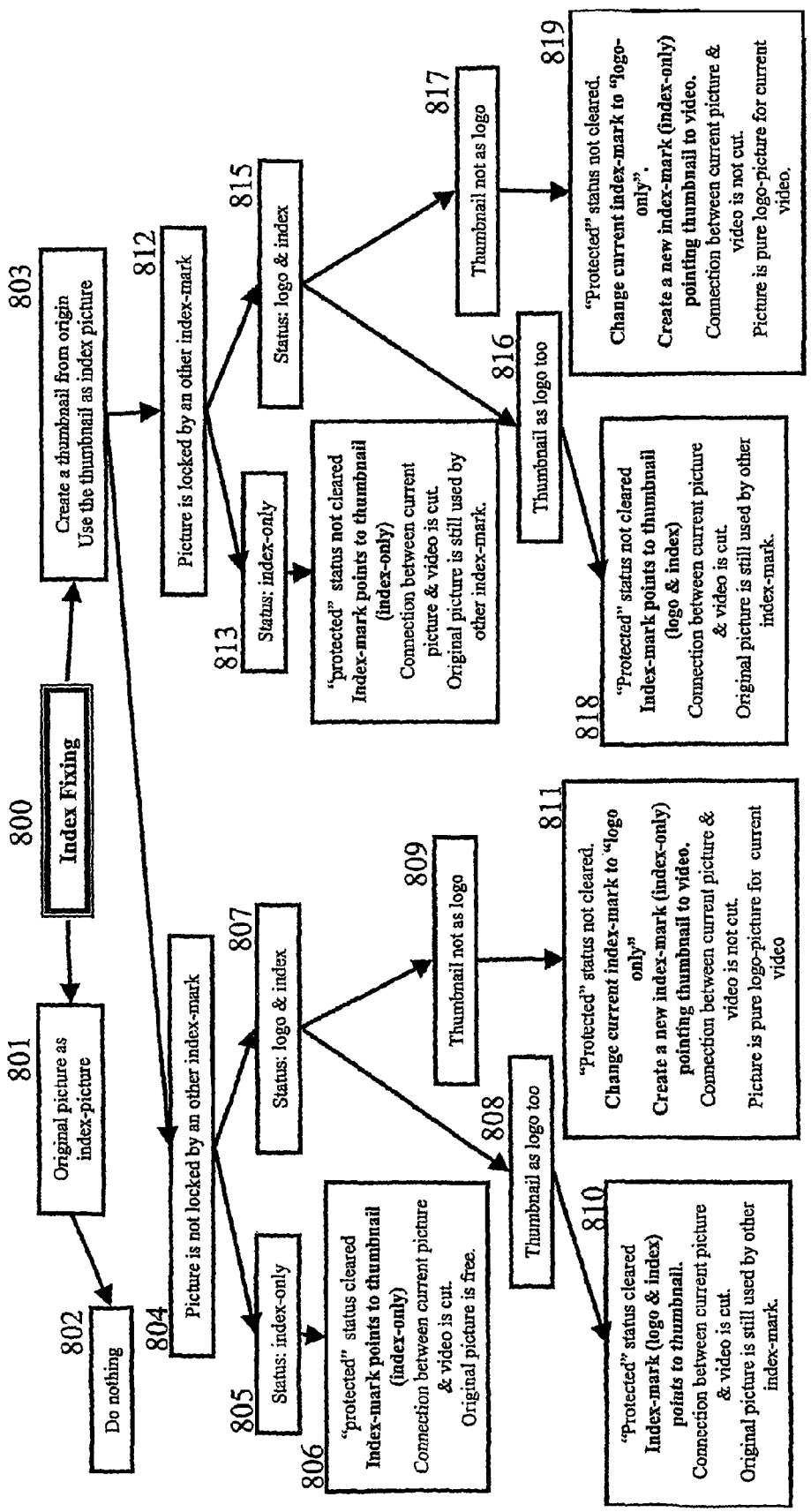

FIG. 5. shows a second part of the logical structure of a media card;

FIG. 6 shows a diagram of the system requirements;

FIG. 7 shows a diagram of the recording procedures of logo and index pictures;

FIG. 8 shows a diagram of the logo fixing during video playback;

FIG. 9 shows a first continuation of FIG. 8;

FIG. 10 shows a second continuation of FIG. 8;

FIG. 11 shows a diagram for the procedure of index fixing.

EXEMPLARY EMBODIMENTS

Figure 1:
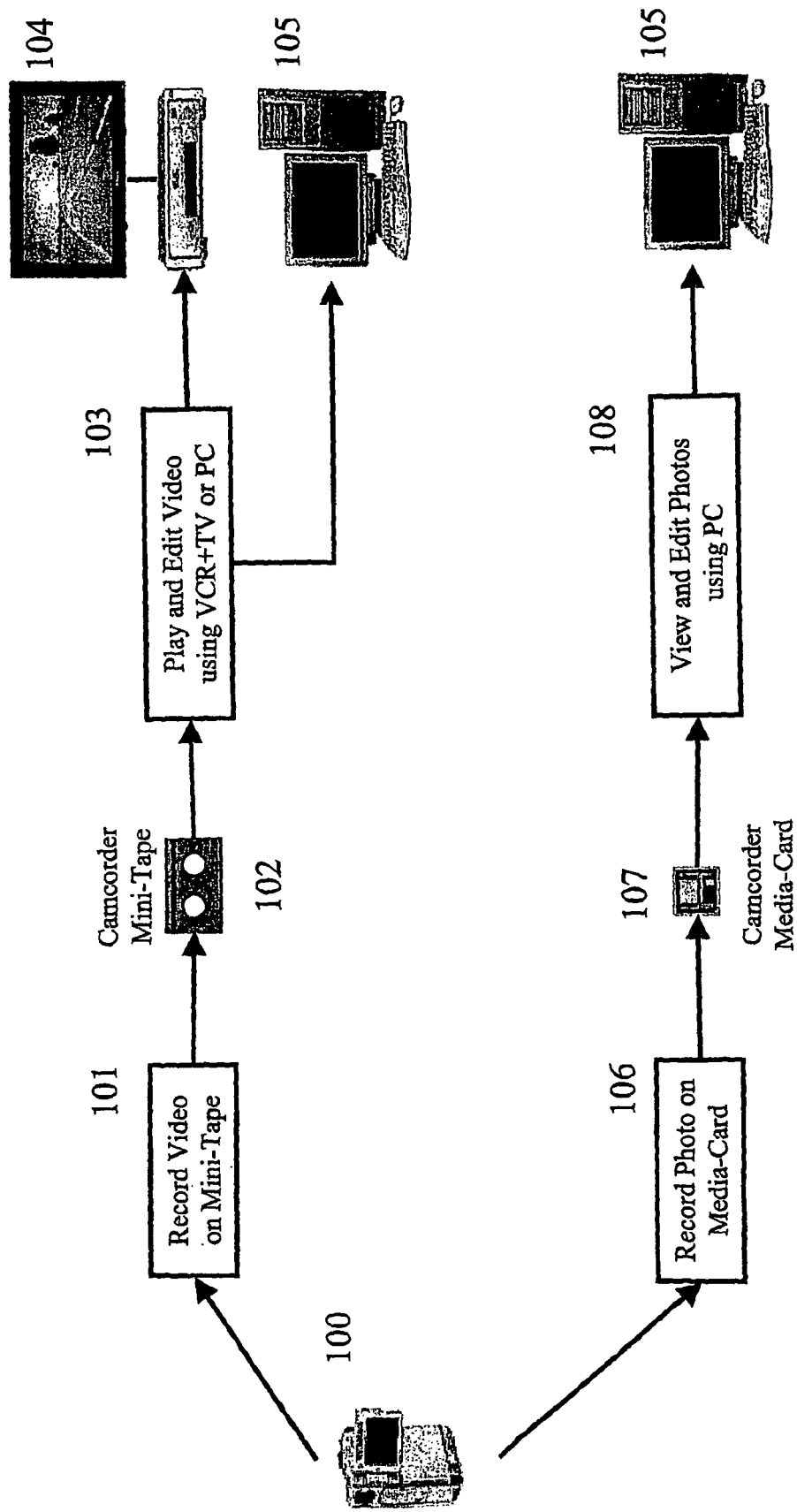
FIG. 1 shows the procedure of taking videos and photos by a digital camcorder of the prior art.
Figure 2:
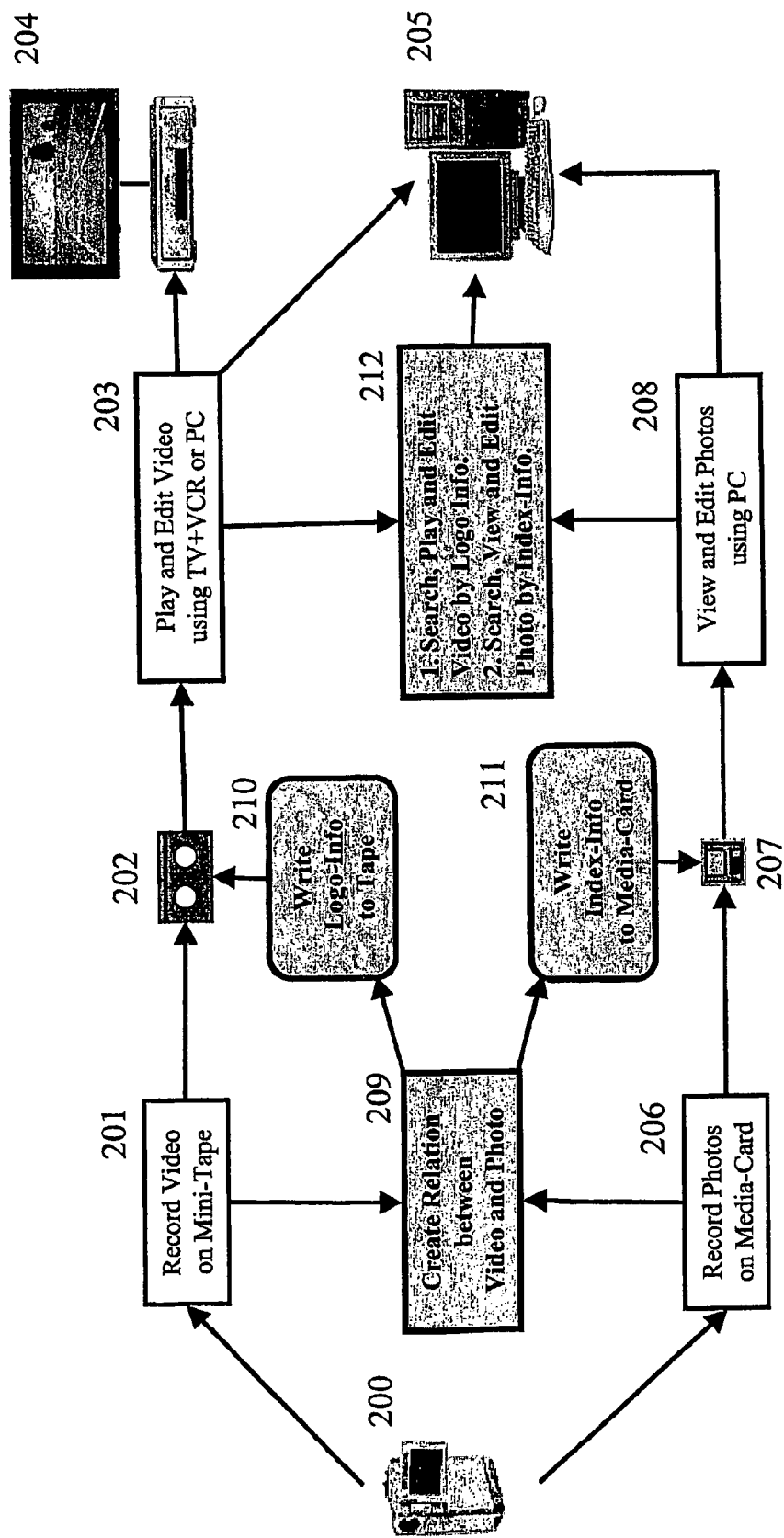
FIG. 2 shows the principle of taking videos and photos by a digital camcorder according to the present invention.

The principle of taking videos and photos by a digital camcorder according to the present invention is shown in FIG. 2. Similar to the prior art, a camcorder 200 records 201 a video on a mini-tape 202. The recorded video may be played back and edited 203 by using a video recorder and a televison set 204 or a personal computer 205. Additionally, the camcorder 200 may record 206 photos on a media card 207. The recorded photos may be viewed and edited 208 by using the personal computer 205. Now, the following steps are provided by the present invention. A relation may be created 209 between the video and photo data. Information concerning the relation is written 210 as logo-info (see also step 302 of FIG. 6) to the tape 202. Similarly information concerning the relation to the video recorded on the tape is written 211 as index-info (see also step 405 of FIG. 6) to the media-card 207. Consequently, the video may be searched, played and edited 212 on the personal computer 205 by using the logo-info. Additionally, a photo may be searched, played and edited 212 on the personal computer 205 by using the index-info.

The preferred system and its implementation components are described in the following, wherein the description for "logo/index picture" is also valid for "logo/index e-video clip".

1. System Requirements 500 (See FIG. 6)

a) It is necessary to equip a camcorder with a set of buttons 501, which allow to put the camcorder in a special "mark input mode". In the basic embodiment, a camcorder has an annotation button in a central and easy to reach position. In an enhanced type of camcorder there may be provided an E-video clip playback function. In order to create a logo/index picture for video, special memory space on a video tape and on a media-card must be reserved.

b) For the video tape 300 (compare also FIG. 3), a special logo track 302 (or logo bytes) for each video frame must be reserved on the tape for recording the logo-mark code 303. The logo-mark code 303 contains link messages from the video on the tape to a picture on the media-card. The logo-mark code 303 contains a media-card ID 304 and a picture ID message 305. The media-card ID message 304 is a kind of volume ID, it may be a predefined media-card name or number. The picture ID includes the picture name message.

Figure 3:
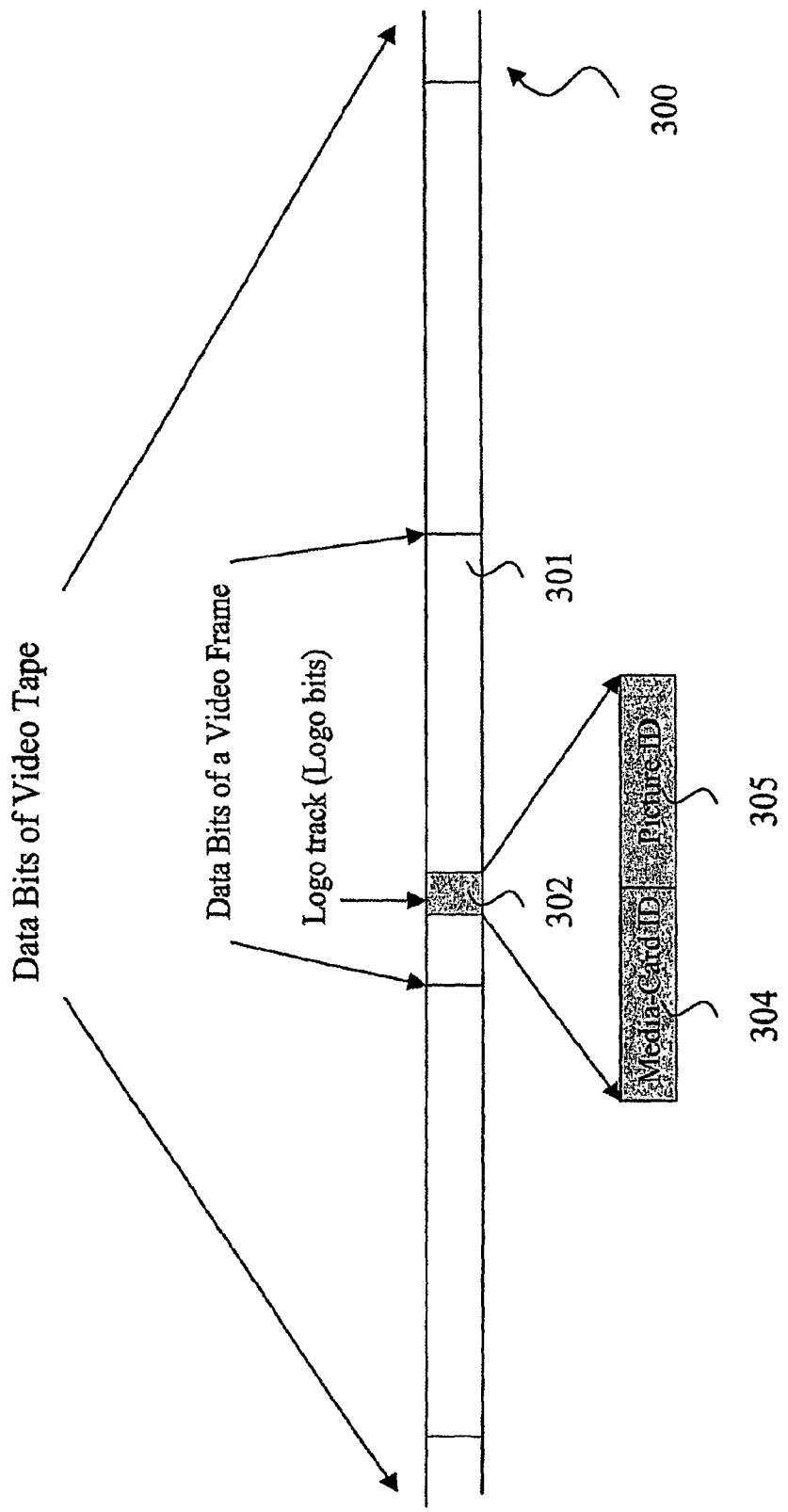
FIG. 3 shows the physical order of a video tape containing a logo track.

FIG. 3 indicates the physical structure of a video tape 300. The video tape 300 contains a plurality of video frames 301 each formed by a number of data bits. Within the video frame 301 there is provided a logo track 302 for the logo-info, i.e. the logo marke code 303, containing a media-card ID 304 and a picture ID 305. Thus, there is a link to a logo picture on a specific media card.

c) For media-card 400 (compare also FIGS. 4 and 5), the index info 405 including a special index file 420, a special temporary file 410 and a special thumbnail directory 430 must be generated in the media-card. The index file 420 in the media-card 400 is created for a recording index-mark code 421. The temporary file 410 is used to keep temporary index code 411 for logo/index picture candidates. The thumbnail directory 430 is set to store all thumbnail pictures 431, which may be used as logo or index pictures (see FIGS. 4 and 6).

d) The index file 420 in the media-card 400 contains index-mark codes 421 of all related pictures in the current media-card as shown in FIG. 6. Whenever a picture is set as logo or index to the video, an index-mark code 421 will be created in the index file 420. The index-mark code 421 includes all link messages between pictures on the media-card 400 and video essence on the tape 300. There are two kinds of index-mark codes 421:

When a picture is set as index picture 422 for video, the index-mark code 421 includes a picture ID 424 and video essence ID message 423. The picture ID 424 contains a picture name 427, directory name 428 and status label 429 of the related picture. The status label shows if the picture is "logo & index", "logo only" or "index only". More about status label will be explained in detail in 2(h) and 3(c to e). The video essence ID 423 contains video tape ID 425, video content start-time and end-time message 426. The video tape ID 425 may be a predefined tape name or number.

Figure 4:
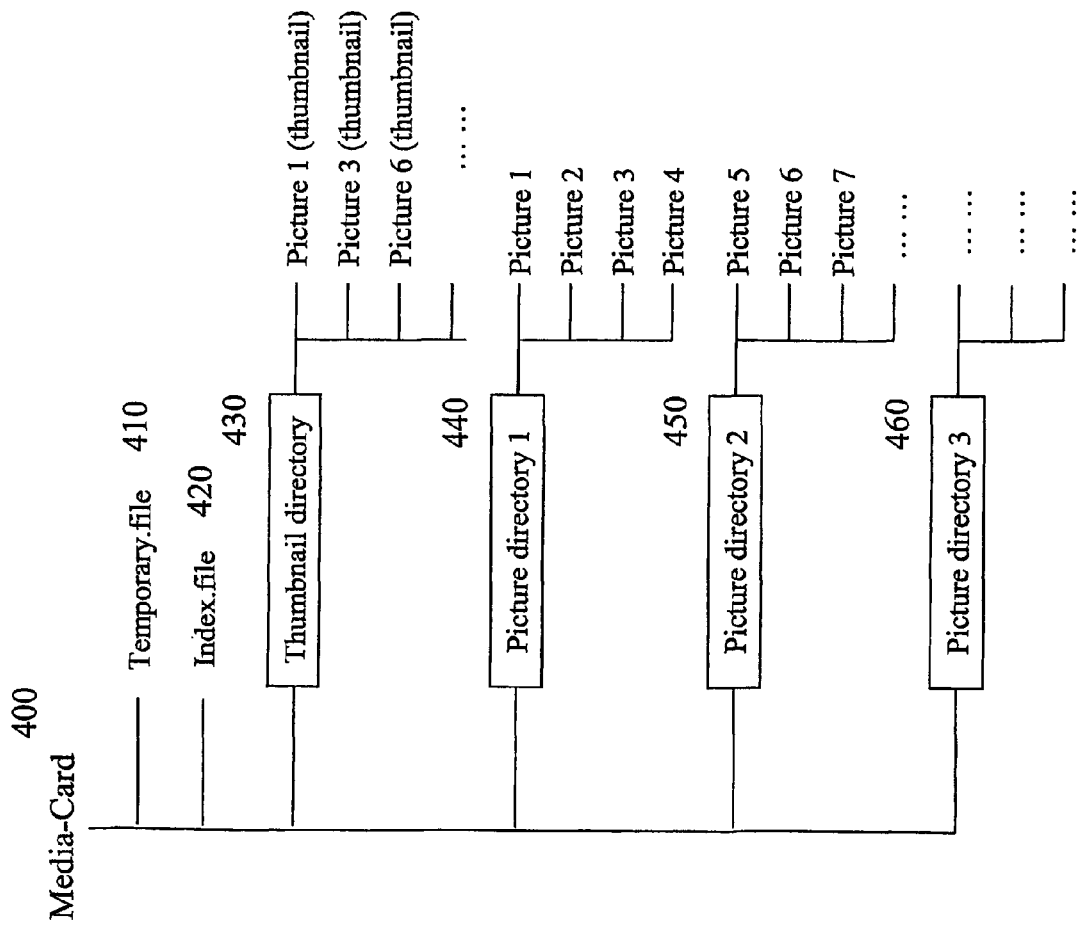
FIG. 4 shows a first part of the logical structure of a media card.

When a picture is only set as logo picture 412 for video, the index-mark code 421 contains only the picture ID 424. In this case, no video essence ID 423 is needed. See also FIG. 5.

e) The temporary file 410 shown in FIG. 5 contains index codes of all candidate pictures in the current media-card 400. When a picture is selected as candidate to create video logo or index, an index code (compare 411 of FIG. 6) will be written in the temporary file 410. The index code includes a picture ID message 424, the picture ID contains picture name 427, directory name 428 and status label 429 of the selected picture. While video recording, camera-man may select predefined logo or index candidate directly from the candidate file.

f) The thumbnail directory 430 shown in FIG. 4 contains all thumbnail pictures, which are used as logo/index pictures for video. Compared to an original picture, a thumbnail picture is reduced in size so that it needs less storage capacity. The thumbnail directory 430 has the advantage of protecting thumbnail pictures so that they are not affected by normal photo editing.

g) A special synchronizing playback method is needed to build e-video clip logo in video frames as indicated by reference signs 502 in FIG. 6. In this case, an e-video clip can be treated as a series of still pictures. Each picture may be built in video frame one by one.

2. Preparation for Recording a) In order to create logo & index pictures for a video while recording, a selected picture, which will be used as logo or index picture, should be recorded before the video is recorded. The picture may be taken by camcorder itself, or imported from other instruments. The picture may be saved as normal camcorder photo format, or as special thumbnail format. The thumbnail format is defined specially for this application. A thumbnail picture will be saved directly in the thumbnail directory 430 of media-card 400 (see FIG. 4). Both photo formatted picture and thumbnail picture can be selected as logo/index picture.

In the case of FIG. 4 pictures 1, 3 and 6 are stored as thumbnail pictures with a reduced size in the thumbnail directory 430. Consequently, the pictures 1, 3 and 6 can be deleted from the picture directories 440 and 450. As a result memory capacity can be saved.

b) The index screen of the camcorder may be used to select a preferred picture. The picture name 427, directory name 428 of the selected picture and a status label 429 (see 2(g)) is encoded as an index code 421, which is saved in the temporary file 410 in the media-card 400. A selected picture can be input into the temporary file 410 by clicking a button of the camcorder. It is also possible to select the picture during video recording by inputting the picture index number directly.

c) All selected pictures must be set to "protected" status, so that they cannot be deleted erroneously.

d) More than one picture can be selected as logo/index candidates picture to be stored in the temporary file. While video recording, all candidate pictures can be browsed through button wheel turning.

e) The logo picture format and position on the video can be defined before, during or after recording. The logo picture can be shrunk or enlarged inside the video frame. Furthermore, the logo picture may be located at the upper, under, left or right corner. It may fill up the whole video frame.

f) The logo picture may be processed according to a pre-defined effect function.

g) The selected picture can be defined in three statuses: "logo & index", "logo only" and "index only". A status label, which represents the status message, is created as part of the index code in the temporary file. The "logo & index" status means that the selected picture is defined both as logo and index picture for video. The "logo only" status means that the selected picture is defined only as logo picture for video, it is impossible to use this picture as index metadata for video essence. The "index only" status means that the selected picture is defined only as index metadata for video essence, it is impossible to use it as logo picture for video. The default status of a selected picture should be defined as "logo & index".

h) The temporary file (see 1(e)) contains index codes of all logo/index candidate pictures. The index code includes picture name, picture directory name and picture status label. The status label can represent "logo & Index", "logo only" and "index only". The temporary file should be created before video recording. The index codes in the candidate file will be cleared as soon as they are invalid.

i) A selected picture can be used multiple as logo/index picture.

3. Recording 600 (See FIG. 7)

a) While video recording, the camera-man only needs to click 601 a button to browse all selected pictures from the candidate file in the media-card. Through button clicking 601, the camera-man can set a selected picture as logo or index picture for video. If no pre-selected picture exists in the candidate file, the camera-man only needs to click a button to browse a list of all pictures of the media-card, and turn a wheel to select a picture and set the picture as logo or index picture for video. For a selected picture the statuses "logo-only" 602, "logo & index" 603 and "index only" 604 may be chosen.

b) If a selected picture is set to be logo picture of video 605, the logo picture may be set to be visible 606 or invisible 607 in the camcorder view finder.

(1) When it is visible 606, its position and frame size may be adjusted by camera-man. The camera-man may choose whether to "copy now" 608 to the video tape or "copy later" 609. If "copy now" 608 is selected, the logo picture with its position and size in the view finder will be embedded in the video contents and be permanently recorded on the video tape. Later the logo picture in the video can not be edited or deleted any more. In this case, it is not necessary to create any logo mark on the tape or index-mark in the media card 610. If "copy later" 609 is selected, the logo picture is not recorded on the video tape, the picture stays still in the media card. It is still possible to edit the logo picture later at a post-processing stage. In this case, both logo-mark and index-mark are generated 611. The logo-mark code is written in the logo track on the tape, and the index-mark code, which contains only picture ID, is written in the index file in the media-card. The selected picture must be set to "protected".

(2) When the logo picture is set to be invisible 607, the logo picture is not recorded on the video tape, and the logo picture will be edited at post-processing stage. In this case, both logo-mark and index-mark are generated 611. The logo-mark code is written in the logo track on the tape, and the index-mark code, which contains only the picture ID, is written in the index file in the media-card. The selected picture must be set to "protected".

c) If a selected picture is in "logo & index" status 603, it means that this picture will be set up as both logo and index picture for video. In this case, both logo-mark and index-mark are generated 611. The logo-mark code is written in the logo track on the tape, and the index-mark code, which contains the picture ID and video essence ID, is written in the index file in the media-card. The logo-mark code and index-mark code are structured as described in paragraph 1.

When a selected picture is set as logo and index picture for video, it should be set to "protected".

In this scenario, the logo picture can be treated as described in 2(e).

d) If a selected picture is in "logo only" status 602, this picture will be created as logo picture for video.

In case, the logo picture is set as "visible"+"copy now" 606,608, the logo picture is recorded on the tape, no logo-mark or index-mark code is generated in this scenario, the related picture in media-card does not need to be set protected, and editing of this picture does not affect the already created log picture.

In case, the logo picture is set "invisible" 607 or "visible"+ "copy later" 606, 609, both logo-mark and index-mark must be generated. The logo mark code is written in logo track (or logo bits) on the video tape. The index-mark code, which contains only the picture ID, is written in the index file of the media-card.

e) If a selected picture is in "index only" status 604, this picture will be created as index picture for video 612. Later, this picture acts as rich media metadata for video essence. In this case, only an index-mark is generated 613, no logo-mark is necessary. The index-mark code, which contains both picture ID and video essence ID, is written in index file in media-card. The selected picture in the media-card must be set to "protected".

4. Logo Fixing 700 (See FIGS. 8, 9 and 10)

a) At a post-processing stage, except the case of 3(b-1), all in the recording stage generated logo pictures need to be edited or fixed.

b) The logo-mark codes can connect video essences and logo pictures. While video playing, the camcorder can automatically read the logo-mark code from a logo track on a tape.

c) When the user plays or edits the video tape, he may choose "playback with logo" 701 or "playback without logo" 702.

When "playback without logo" is chosen the camcorder will play the video tape normally, logo-marks on video tape are ignored 706.

When "playback with logo" 701 is chosen, the camcorder reads all logo-marks. When the camcorder finds a new logo-mark, it will pause the tape playback at the current video frame, and ask the user whether to build the logo picture in the video frame or not. If the user replies "not built-in", the camcorder goes on playing the tape till next new logo-mark. If the user replies "built-in", the camcorder will parse the logo-mark code, tell the user to insert the correct media-card, read the index file of the media-card, find out the directory of the logo picture, look for the logo picture on the media-card and build the picture in the video frame. The position and size of the logo picture viewed in the video frame can be arranged and adjusted. The same logo picture at the same position and with the same size will be built in the following video frames, which contain the same logo-mark code. When the camcorder reads a new logo-mark code, it will repeat the above procedure.

d) When "playback with logo" 701 is chosen, the user may have three choices to process the logo picture:

1) The user may record the logo picture permanently 703 in the video frame at the desired position with the desired size as shown in FIG. 9. Afterwards, the camcorder will check the index file and find out if this picture is still locked by other index mark.

If the picture is not locked by another index mark 707 and it has "logo only" status 708 in the current index mark, the "protected" status of the picture will be cleared 709. Its index mark in index file will be cleared too. From now on, the connection between this picture and video is cut. The picture is free.

If the picture is not locked by another index mark 707 and it has "logo & index" status 710 in the current index mark, the "protected" status of this picture will not be cleared, but its status label in the current index mark will be modified as "index only" 711. From now on, this picture will act as pure index picture.

If the picture is locked by another index mark 712 and it has "logo only" status 713 in the current index mark, the protected mark of the picture will not be cleared 714. But, the current index mark in index file will be cleared.

If the picture is locked by another index mark 712 and it has "logo & index" status 715 in current index mark, the "protected" status of this picture will not be cleared, but its status label in the current index mark will be modified as "index only" 716. From now on, this picture will act as index picture for the current video clip.

2) The user does not want to record the logo picture in the video frame at present 704. The user, however, may let the camcorder generate a thumbnail picture based on the logo picture 704, as shown in FIG. 10. The thumbnail picture will replace the original logo picture and act as logo picture for video 717. The thumbnail picture only needs less storage space, and the original logo picture will be free from current connection. The thumbnail picture will be saved in the thumbnail directory (see 1.(c) and (f)) in the media-card with the same file name as the original logo picture. Later, the thumbnail picture will be used as the only logo picture for video.

If the original logo picture is not locked by other index mark 719 and it has "logo only" status 720 in the current index mark, the "protected" status of the picture will be cleared 721, its directory name in current index mark will be modified to the name of the thumbnail directory. The thumbnail directory name in current index mark will automatically lead the camcorder to read the thumbnail picture in thumbnail directory as the logo picture. The connection between original logo picture and video is cut. The original picture is free.

If the original logo picture is not locked by other index mark 719 and it has "logo & index" status 722 in current index mark, the "protected" status of the picture will be cleared 723. Its directory name in the current index mark will be modified to that of the thumbnail directory. The thumbnail picture in the thumbnail directory will act as new logo & index picture for video. The connection between original logo & index picture and video is cut. The original picture is free.

If the original logo picture is locked by another index mark 724 and it has "logo only" status 725 in current index mark, the "protected" status of the picture will not be cleared 726, its directory name in current index mark will be modified to the thumbnail directory. This thumbnail directory in the current index mark will automatically lead the camcorder to read the thumbnail picture in thumbnail directory as the logo picture. The connection between original logo picture and current video clip is cut.

If the original logo picture is locked by another index mark and it has "logo & index" status 727 in current index mark, the "protected" status of the picture will not be cleared 728. Its directory name in current index mark will be modified to the thumbnail directory. The thumbnail picture in the thumbnail directory will act as new logo & index picture for video. The connection between original logo & index picture and current video clip is cut.

3) The logo picture will not be recorded to video frame 705 at this moment. Nothing changes 729.

e) The user can simply replace the original logo picture by another picture, by exchanging their file names (and modifying the directory name in index-mark code, if they are not located in the same directory).

f) When the video on tape is cleared, the camcorder will promote the user to insert the related media-card, and clear all related index marks from the index file in the media-card, and clear the "protected" status of all related pictures.

5. Index Fixing 800 (See FIG. 11)

a) Index-mark codes can link index pictures to video essences. The user can use an index picture to search video essences. Furthermore, the user can use an index picture to summary video contents, which are linked to the same index picture. The camcorder can automatically read index-mark codes in an index file of a media-card.

b) The user can play video essences through "clicking" an index picture. Furthermore, the user can use index pictures to edit video contents.

c) The user may use the original picture as index picture 801 so that no further actions is necessary 802, and the user may also generate a thumbnail picture based on the original one and use the thumbnail picture as new index picture 803. The thumbnail picture is saved in the thumbnail directory and it has the same name as that of the original picture.

If the picture is not locked by another index mark 804 and it has "index only" status 805 in current index mark, the "protected" status of the picture will be cleared 806. The directory name in current index mark will be modified to the thumbnail directory name. The connection between the original picture and video essence is cut. The original picture is free.

If the picture is not locked by another index mark 804 and it has "logo & index" status 807 in the current index mark, the user can choose between "thumbnail as logo too" 808 and "thumbnail not as logo" 809:

When user chooses "thumbnail as logo too" 808, the "protected" status of the picture will be cleared 810. The directory name in current index mark will be modified to that of the thumbnail directory name. The connection between the original picture and video essence is cut. The original picture is free. The thumbnail acts as both logo and index picture.

When the user chooses "thumbnail not as logo" 809, the "protected" status of the original picture will not be cleared, but its status label in the current index mark will be modified as "logo only" 811. From now on, this picture will act as pure logo picture. In this scenario, a new index mark with "index only" status label, which points to the same video essence as that of the original index picture, must be created for the thumbnail picture, so that the user can use the thumbnail as index picture.

If the picture is locked by another index mark 812 and it has "index only" status 813 in current index mark, the "protected" mark of the picture will not be cleared 814. The directory name in the current index mark will be modified to the thumbnail directory name. The connection between the original picture and current video essence is cut.

If the picture is locked by another index mark 812 and it has "logo & index" status 815 in current index mark, the "protected" status of this picture will not be clered. In this case, the user may choose between "thumbnail as logo too" 816 and "thumbnail not as logo" 817: When user chooses "thumbnail as logo too" 816, the directory name in the current index mark will be modified to the thumbnail directory name. The connection between the original picture and current video essence is cut 818. When the user chooses "thumbnail not as logo" 817, the status label in the current index mark will be modified as "logo only" 819. From now on, this picture will act as pure logo picture. In this scenario, a new index mark with "index only" status, which points to the same video essence as that of the original index picture, must be created for the thumbnail picture, so that the user can use it as index picture.

6. Application Examples

Scenario 1:

While camera-man is shooting a video scene or object, he is used to explain something about the scene or object. His voice will be recorded with the video content together. In this case, the camera-man can only be heard, not be seen. Usually, it is desired to hear his voice and see his face at the same time, just like that in TV-news program, while talking to a journalist through phone call, a photo of the journalist will be shown as logo picture in the display. With the help of this invention, the camera-man makes himself to be visible in video scene too. At first, the camera-man takes a photo or an e-video clip of himself. Then, while video recording, he set this photo or e-video clip as logo picture to the video content.

Scenario 2:

Usually, photos and e-video clips are highlight contents of videos. They can be used as logo labels to summary video contents, or provide additional visual messages to video contents. For example, one may take a photo of Eiffel-Tower and use this photo as logo image for all video contents, which are recorded in Paris, or using Brandenburger-Tor as logo for all video taken in Berlin. If an e-video clip is created as logo to video, it provides a kind of simulated "picture in picture" effect.

Scenario 3:

By using recorded index pictures, the camera-man can search video contents quickly and effectively. They can help the user to edit videos efficiently.

Scenario 4:

By using this invention, one can generate rich media metadata for video essence. Such rich metadata will be used widely in the future.

The invention claimed is:

1. Method for linking first and second multimedia data within a consumer electronics device, wherein the multimedia data comprise video, still picture and/or audio data, including the steps of recording the first multimedia data on a first storage medium;

detecting a user selection of a portion of said first multimedia data;

creating automatically link information to said selected portion of first multimedia data, the link information containing a reference to said portion of multimedia data on said first storage medium;

capturing in real-time second multimedia data, after said first multimedia data were recorded on the first storage medium;

inserting into said second multimedia data said automatically created link information; and storing on a second storage medium multimedia data resulting from said second multimedia data and said inserted link information, wherein said second storage medium is removable independently from said first storage medium.

2. Method according to claim 1, further comprising the steps of:

detecting a user selection of one or more candidate portions of said first multimedia data;

storing references to said selected candidate portions on the first storage medium, and;

detecting a user selection of one of said one or more candidate portions as a logo or index data portion.

3. Method according to claim 1, wherein said automatically created link information or said reference thereon is stored in a reserved memory space on said second storage medium, the memory space relating to a single video frame.

4. Method according to claim 1, further comprising the steps of creating automatically second link information, the second link information containing a reference to a portion of the first multimedia data and, if said portion of the first multimedia data was selected by the user, a reference to the second multimedia data on said second storage medium;

storing said second link information on first storage medium.

5. Method according to claim 4, wherein a first file and a second file are created and stored on the first storage medium, the first file containing a list of references to the portions of said first multimedia data, and the second file containing a list of references of selected portions of the first multimedia data and said references to the second multimedia data on said second storage medium, wherein the references indicate particular portions of the second multimedia data.

6. Method according to claim 1, wherein said first multimedia data is a still picture or photo or a picture sequence, such as a short video or cartoon.

7. Method according to claim 1, wherein a status label is associated with each portion of recorded first multimedia data, the status label indicating whether the respective portion is selected, and wherein a portion of recorded first multimedia data having selected status is protected from being deleted.

8. Video camera or camcorder, comprising:
means for recording first multimedia data on a first storage medium;
means for detecting a user selection of a portion of said first multimedia data;
means for creating automatically link information to said selected portion of first multimedia data, the link information containing a reference to said portion of multimedia data recorded on said first storage medium;
camera means for generating in real-time second multimedia data;
means for inserting into said second multimedia data either said automatically created link information; and
means for storing on a second storage medium multimedia data resulting from said second multimedia data and said inserted information, wherein said second storage medium is separately removable and different from said first storage medium.

9. Video camera or camcorder according to claim 8, wherein the means for detecting a user selection of a portion of said first multimedia data comprises
means for detecting a user selection of one or more candidate portions of said first multimedia data;
means for initiating the storing of said selected candidate portions or references thereon on the first storage medium;
means for detecting a user selection of one or more of said one or more candidate portions as logo or index data portions; and
means for initiating the storing of the selected logo or index data portion on the first storage medium, wherein references on the selected candidate portions are stored in a first file and the selected logo or index data portions or reference thereon are stored in a separate second file on the first storage medium.

10. Video camera or camcorder according to claim 8, wherein said means for storing on a second storage medium the resulting multimedia data stores said references on said automatically created link information in a reserved memory space of said second storage medium, the memory space relating to a single video frame.

11. Video camera or camcorder according to claim 8, further comprising
means for playing back the recorded second multimedia data having said information inserted; and
means for simultaneously playing back the portion of the first multimedia data identified by said reference, wherein the identified portion of first multimedia data is built into the second multimedia data.

12. Video camera or camcorder according to claim 8, further comprising:
means for automatically creating second link information, the second link information containing a reference to a portion of the first multimedia data and, if said portion of the first multimedia data was selected by the user, a reference to the second multimedia data on said second storage medium; and
means for storing said second link information on said first storage medium.

13. Video camera or camcorder, comprising:
recorder that records first multimedia data on a first storage medium;
camera for generating in real-time second multimedia data;
processor that in response to a user selection of a portion of said first multimedia data operates the camera in an insert mode;
processor that creates automatically link information to said selected portion of first multimedia data, the link information containing a reference to said portion of multimedia data recorded on said first storage medium and that inserts into said second multimedia data said automatically created link information; and
storage unit that stores on a second storage medium multimedia data resulting from said second multimedia data and said inserted information, wherein said second storage medium is separately removable and different from said first storage medium.

14. Video camera or camcorder according to claim 13, further comprising
user interface that detects a user selection of one or more candidate portions of said first multimedia data, and that detects a user selection of one or more of said one or more candidate portions as logo or index data portions;
controller that initiates the storing of said selected candidate portions or references thereon on the first storage medium; and
controller that initiates the storing of the selected logo or index data portion on the first storage medium, wherein references on the selected candidate portions are stored in a first file and the selected logo or index data portions or reference thereon are stored in a separate second file on the first storage medium.

15. Video camera or camcorder according to claim 13, wherein said storage that stores on said second storage medium the resulting multimedia data stores said references on said automatically created link information in a reserved memory space of said second storage medium, the memory space relating to a single video frame.

16. Video camera or camcorder according to claim 13, further comprising
playback unit for playing back the recorded second multimedia data having said information inserted, and for simultaneously playing back the portion of the first multimedia data identified by said reference, wherein the identified portion of first multimedia data is built into the second multimedia data.

17. Video camera or camcorder according to claim 13, further comprising:
processor that automatically creates second link information, the second link information containing a reference to a portion of the first multimedia data and, if said portion of the first multimedia data was selected by the user, a reference to the second multimedia data on said second storage medium; and
said recorder that stores said second link information on said first storage medium.

* * * * *